US012497225B2

(12) United States Patent
Thompson

(10) Patent No.: US 12,497,225 B2
(45) Date of Patent: Dec. 16, 2025

(54) CARRIER FOR CONTAINERS

(71) Applicant: Graphic Packaging International, LLC, Atlanta, GA (US)

(72) Inventor: Jon Thompson, Bristol (GB)

(73) Assignee: Graphic Packaging International, LLC, Atlanta, GA (US)

( * ) Notice: Subject to any disclaimer, the term of this patent is extended or adjusted under 35 U.S.C. 154(b) by 3 days.

(21) Appl. No.: 18/581,499

(22) Filed: Feb. 20, 2024

(65) Prior Publication Data

US 2024/0278968 A1 Aug. 22, 2024

Related U.S. Application Data

(60) Provisional application No. 63/447,069, filed on Feb. 21, 2023.

(51) Int. Cl.

| | |
|---|---|
| ***B65D 71/36*** | (2006.01) |
| ***B31B 50/26*** | (2017.01) |
| *B31B 100/00* | (2017.01) |

(52) U.S. Cl.

CPC ............ *B65D 71/36* (2013.01); *B31B 50/262* (2017.08); *B31B 2100/00* (2017.08); *B65D 2571/00141* (2013.01); *B65D 2571/00277* (2013.01); *B65D 2571/00444* (2013.01); *B65D 2571/0066* (2013.01); *B65D 2571/00728* (2013.01)

(58) Field of Classification Search

CPC ... B31B 50/262; B31B 2100/00; B65D 71/18; B65D 71/32; B65D 71/36; B65D 2571/00141; B65D 2571/00277; B65D 2571/00444; B65D 2571/0066; B65D 2571/00728

USPC ........................................................... 206/427

See application file for complete search history.

(56) References Cited

U.S. PATENT DOCUMENTS

| | | | | |
|---|---|---|---|---|
| 2,899,123 A * | 8/1959 | Currie, Jr. | B65D 71/36 206/427 |
| 3,049,282 A * | 8/1962 | Chidsey, Jr. | B65D 71/18 206/434 |
| 3,269,531 A * | 8/1966 | Weiss | B65D 71/32 206/427 |
| 3,894,681 A | 7/1975 | Arneson et al. | |
| 4,155,449 A * | 5/1979 | Bryne | B65D 71/36 206/427 |
| 5,538,133 A | 7/1996 | Campbell et al. | |

(Continued)

OTHER PUBLICATIONS

International Search Report and Written Opinion for PCT/US2024/016419 dated Jun. 5, 2024.

*Primary Examiner* — Bryon P Gehman

(74) *Attorney, Agent, or Firm* — Andrew N. Claerbout; FisherBroyles, LLC

(57) ABSTRACT

A carrier for holding a plurality of containers includes a plurality of panels extending at least partially around an interior of the carrier, the plurality of panels including a top panel, a bottom panel, and at least one side panel, a plurality of end flaps foldably connected to a respective panel of the plurality of panels at least partially overlapped to form at least one end of the carrier, container retention features in the top panel for at least partially receiving a portion of a respective container of the plurality of containers, and at least one open corner of the carrier defined between a free edge of the top panel, a free edge of the bottom panel, and a free edge of the at least one side panel.

55 Claims, 4 Drawing Sheets

(56) References Cited

U.S. PATENT DOCUMENTS

| | | | | |
|---|---|---|---|---|
| 5,772,030 | A | 6/1998 | Baxter | |
| 6,105,774 | A | 8/2000 | Jackson | |
| 7,367,453 | B2 * | 5/2008 | Sutherland | B65D 71/36<br>206/427 |
| 2004/0188300 | A1 | 9/2004 | Sutherland | |

* cited by examiner

CARRIER FOR CONTAINERS

CROSS-REFERENCE TO RELATED APPLICATION

The present application claims the benefit of U.S. Provisional Patent Application No. 63/447,069, filed on Feb. 21, 2023.

INCORPORATION BY REFERENCE

The disclosure of U.S. Provisional Patent Application No. 63/447,069, filed on Feb. 21, 2023, is hereby incorporated by reference for all purposes as if set forth in its entirety.

BACKGROUND OF THE DISCLOSURE

The present disclosure generally relates to cartons or carriers for holding, displaying, and/or transporting containers.

SUMMARY OF THE DISCLOSURE

According to one aspect, the disclosure is generally directed to a carrier for holding a plurality of containers, the carrier comprising a plurality of panels extending at least partially around an interior of the carrier, the plurality of panels comprising a top panel, a bottom panel, and at least one side panel, a plurality of end flaps foldably connected to a respective panel of the plurality of panels at least partially overlapped to form at least one end of the carrier, container retention features in the top panel for at least partially receiving a portion of a respective container of the plurality of containers; and at least one open corner of the carrier defined between a free edge of the top panel, a free edge of the bottom panel, and a free edge of the at least one side panel.

According to another aspect, the disclosure is generally directed to a blank for forming a carrier for holding a plurality of containers, the blank comprising a plurality of panels for extending at least partially around an interior of the carrier formed from the blank, the plurality of panels comprising a top panel, a bottom panel, and at least one side panel, a plurality of end flaps foldably connected to a respective panel of the plurality of panels for being at least partially overlapped to form at least one end of the carrier formed from the blank, container retention features in the top panel for at least partially receiving a portion of a respective container of the plurality of containers, and a free edge of the top panel, a free edge of the bottom panel, and a free edge of the at least one side panel for being arranged for forming at least one open corner of the carrier formed from the blank.

According to another aspect, the disclosure is generally directed to a method of forming a carrier for holding a plurality of containers, the method comprising obtaining a blank, the blank comprising a plurality of panels comprising a top panel, a bottom panel, and at least one side panel, a plurality of end flaps foldably connected to a respective panel of the plurality of panels, and container retention features in the top panel, positioning the plurality of panels extending at least partially around an interior of the carrier, at least partially overlapping the plurality of end flaps to form at least one end of the carrier, positioning the container retention features for at least partially receiving a portion of a respective container of the plurality of containers, and arranging a free edge of the top panel, a free edge of the bottom panel, and a free edge of the at least one side panel to form at least one open corner of the carrier.

According to another aspect, the disclosure is generally directed to a package, the package comprising a plurality of containers a carrier holding the plurality of containers, the carrier comprising a plurality of panels extending at least partially around an interior of the carrier, the plurality of panels comprising a top panel, a bottom panel, and at least one side panel, a plurality of end flaps foldably connected to a respective panel of the plurality of panels at least partially overlapped to form at least one end of the carrier, container retention features in the top panel at least partially receiving a portion of a respective container of the plurality of containers, and at least one open corner of the carrier defined between a free edge of the top panel, a free edge of the bottom panel, and a free edge of the at least one side panel.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

The present disclosure generally relates to carriers, packages, constructs, sleeves, cartons, or the like, for holding and displaying containers such as jars, bottles, cans, etc. In some embodiments, the containers can be beverage containers, e.g., cans formed of a metallic material such as aluminum or bottles formed of a plastic or glass. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Carriers and packages according to the present disclosure can accommodate containers of numerous different shapes. For the purpose of illustration and not for the purpose of limiting the scope of the disclosure, the following detailed description describes beverage containers (e.g., generally cylindrical containers such as aluminum cans) at least partially disposed within the package embodiments. In this specification, the terms "lower," "bottom," "upper" and "top" indicate orientations determined in relation to fully erected carriers and packages.

Figure 1:
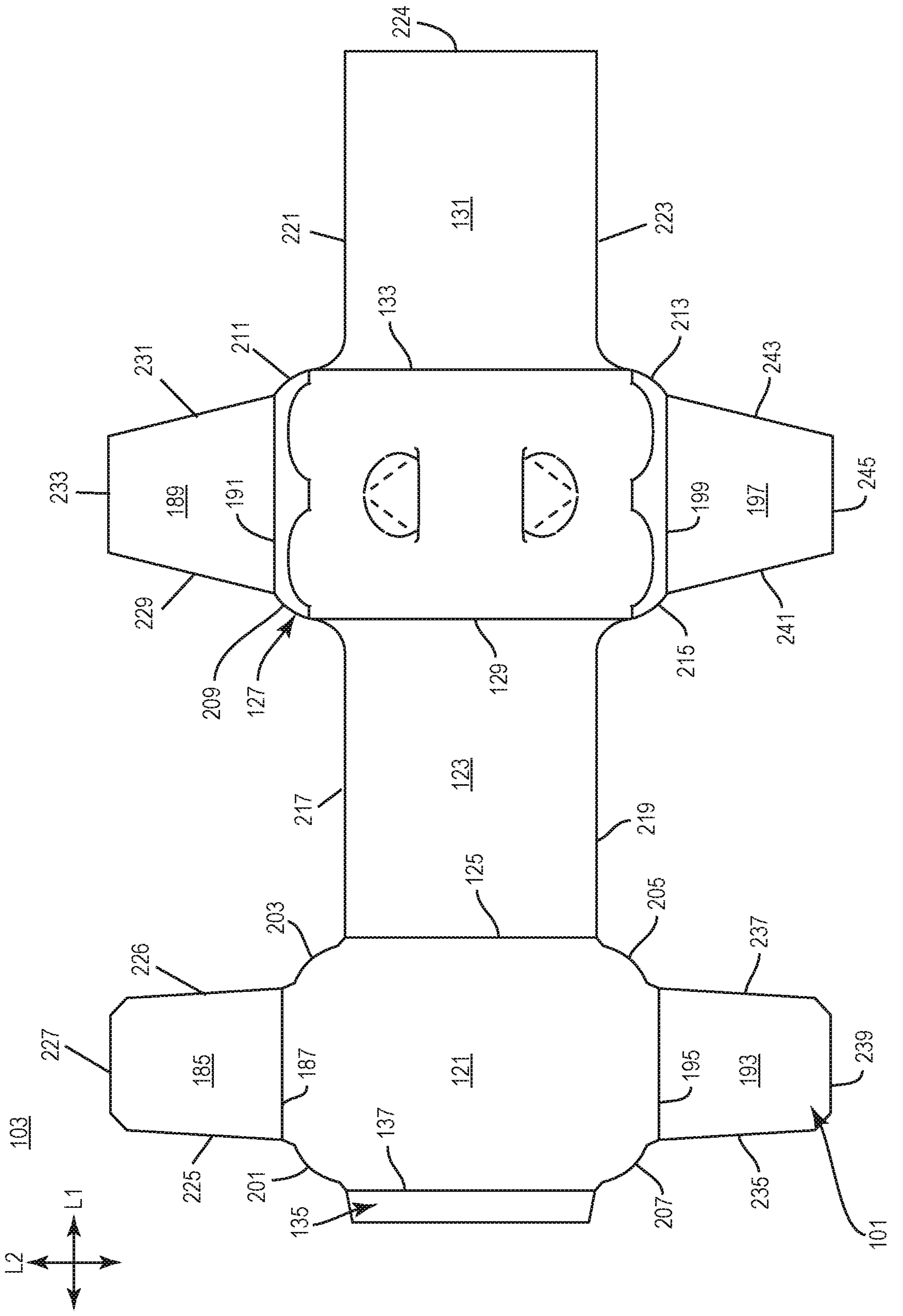
FIG. 1 is a plan view of an outer surface of a blank for forming a carrier according to an exemplary embodiment of the disclosure.
Figure 1A:
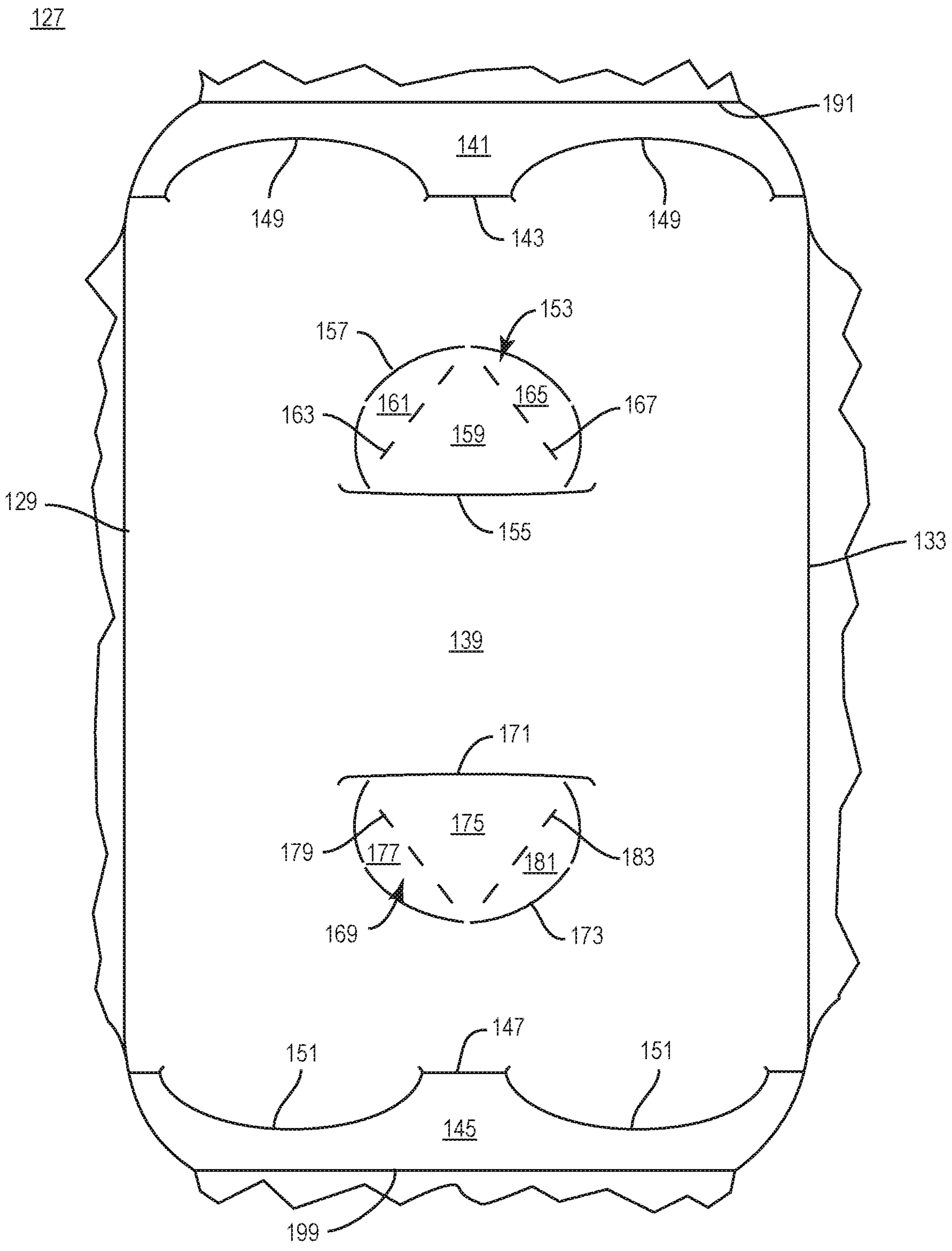
FIG. 1A is an enlarged view of a portion of the blank of FIG. 1.

FIG. 1 is a plan view of an exterior surface 101 of a blank 103 for forming a carrier 105 (FIG. 3) according to an exemplary embodiment of the disclosure. FIG. 1A is an enlarged view of a portion of the blank 103. As described further herein, the carrier 105 can be configured for holding/supporting/retaining/receiving a plurality of containers C. The carrier 105 can be provided with one or more containers to form a package 107 (FIG. 3).

Figure 3:
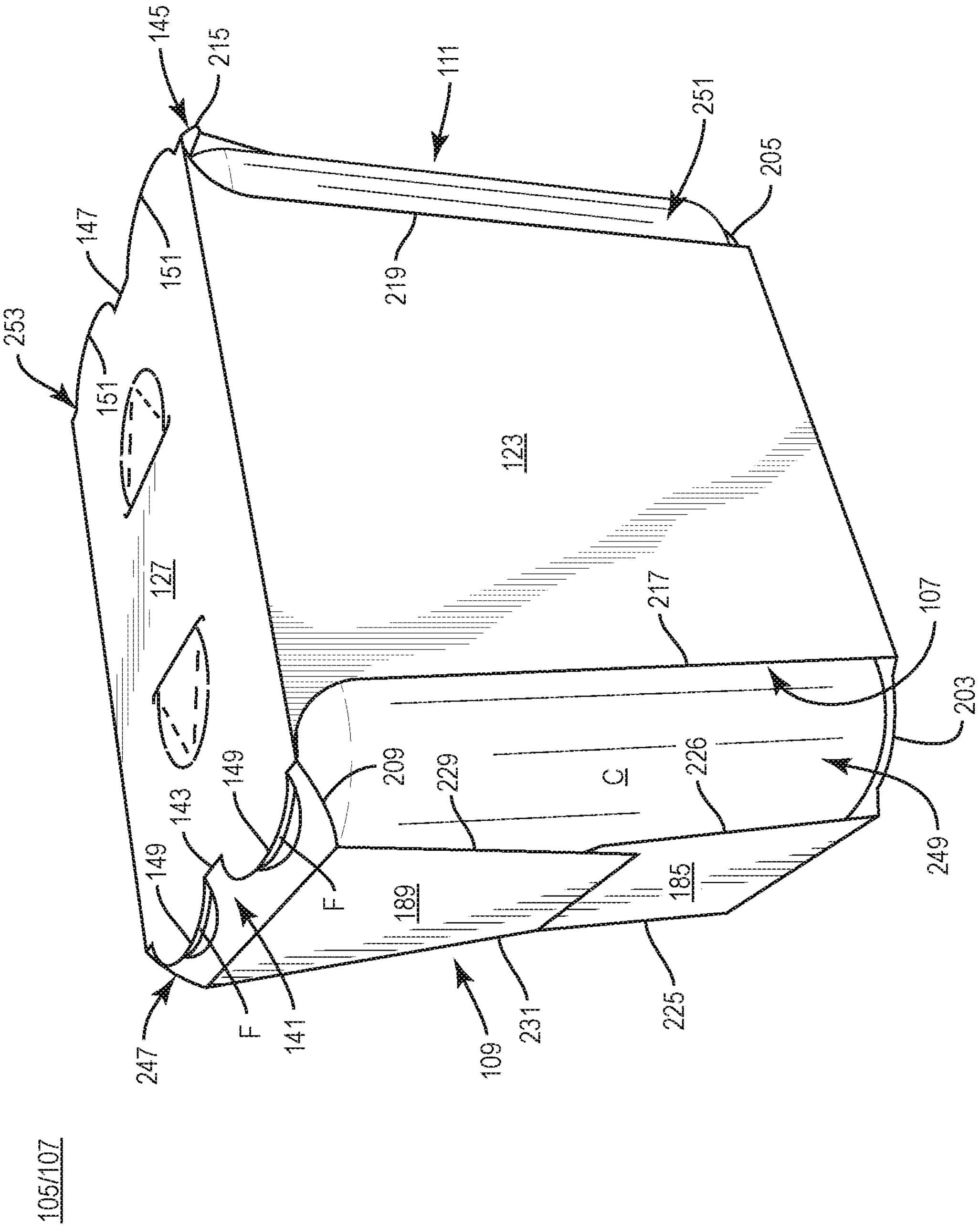
FIG. 3 is a perspective view of a carrier formed from the blank of FIG. 1 according to an exemplary embodiment of the disclosure.

As shown in FIG. 3, the carrier 105 is sized to contain or support six containers C in two rows of three containers, but it will be understood that the carrier 105 can be sized and shaped to hold containers of a different or same quantity in more than one layer and/or in different row/column arrangements (e.g., 1×6, 2×2, 2×3, 2×4, 2×5, 2×6, 3×3, 3×4, 2×5, 3×6, 2×6×2, 3×5, 3×4, 4×5, 2×9, 2×6, 4×4, 4×5, 4×6, etc.)

In the illustrated embodiment, the containers C can be containers in the form of beverage containers (FIG. 2) having a lower base portion B, a top portion T generally comprising a neck N that tapers inwardly from a flange portion F at the top of the neck N that extends radially outward from the neck N, and a top surface TS below the flange portion that includes a pull-tab P.

Still referring to FIGS. 1 and 1A, the blank 103 has a longitudinal axis L1 and a lateral axis L2. In one embodiment, the axis L1 can be a lateral axis and the axis L2 can be a longitudinal axis. In the illustrated embodiment, the blank 103 includes a plurality of panels for at least partially extending around the interior 107 of the carrier 105 and that includes a bottom panel 121, a first side panel 123 (broadly, "second side panel") foldably connected to the bottom panel 121 at a lateral fold line 125, a top panel 127 foldably connected to the first side panel 123 at a lateral fold line 129, and a second side panel 131 (broadly, "first side panel") foldably connected to the top panel 127 at a lateral fold line 133.

An attachment flap 135 can be foldably connected to the bottom panel 121 at a lateral fold line 137.

As shown in FIG. 1A, the top panel 127 can include a central portion 139, a first marginal portion 141 (broadly, "second marginal portion") foldably connected to the central portion 139 at a longitudinal fold line 143 (broadly, "first fold line" or "second fold line"), and a second marginal portion 145 (broadly, "first marginal portion") foldably connected to the central portion 139 at a longitudinal fold line 147.

In the illustrated embodiment, a pair of laterally spaced curved cuts 149 can interrupt the fold line 143, the cuts 149 generally curving away from a longitudinal centerline of the top panel 127. Similarly, a pair of laterally spaced curved cuts 151 can interrupt the fold line 147, the cuts 151 generally curving away from the longitudinal centerline of the top panel 127.

As described further herein, one or more portions of one or more of the central portion 139 of the top panel 127, the first marginal portion 141 of the top panel 127, the second marginal portion 145 of the top panel 127, the fold lines 143, 147, the cuts 149, 151, and associated features thereof can be container retention features of the blank 103 and carrier 105 formed therefrom, in the top panel 127, for securing one or more containers C to the carrier 105. As also described, the cuts 149, 151 are for at least partially receiving at least a portion of a respective container C of the plurality of containers C therethrough.

A first finger flap or first handle flap 153 can be foldably connected to the top panel 127 at a longitudinal fold line 155 and at least partially separable therefrom at a curved cut 157 with endpoints that intersect the fold line 155. A pair of relief cuts can also extend from endpoints of the fold line 155. The handle flap 153 can include a central portion 159, a first marginal portion 161 foldably connected to the central portion 159 at an oblique line of weakening 163, and a second marginal portion 165 foldably connected to the central portion 159 at an oblique line of weakening 167.

Similarly, a second finger flap or second handle flap 169 can be foldably connected to the top panel 127 at a longitudinal fold line 171 and at least partially separable therefrom at a curved cut 173 with endpoints that intersect the fold line 171. A pair of relief cuts can also extend from endpoints of the fold line 171. The handle flap 169 can include a central portion 175, a first marginal portion 177 foldably connected to the central portion 175 at an oblique line of weakening 179, and a second marginal portion 181 foldably connected to the central portion 175 at an oblique line of weakening 183.

As described herein, the handle flaps 153, 169 can be handle features of the blank 103 and carrier 105 formed therefrom, in the top panel 127.

The blank 103 and carrier formed therefrom can also include a plurality of end flaps foldably connected to a respective panel of the plurality of panels. In the illustrated embodiment, the plurality of end flaps can include a first bottom side end flap 185 foldably connected to the bottom panel 121 at a longitudinal fold line 187, a first top side end flap 189 foldably connected to the top panel 127 at a longitudinal fold line 191, a second bottom side end flap 193 foldably connected to the bottom panel 121 at a longitudinal fold line 195, and a second top side end flap 197 foldably connected to the top panel 127 at a longitudinal fold line 199.

In some embodiments, the attachment flap 135 can be considered an end flap of a plurality of end flaps foldably connected to a respective panel of the plurality of panels of the blank 103 and carrier 105 formed therefrom. In other embodiments, the attachment flap 135 can be considered a panel of the plurality of panels.

As described further herein, the side end flaps 185, 189 are for being at least partially overlapped to form a first end 109 (broadly, "second end") of the carrier 105, and the side end flaps 193, 197 are for being at least partially overlapped to form a second end 111 (broadly, "first end") of the carrier 105.

The aforementioned arrangement of the blank 103 and the carrier 105 formed therefrom can be such that a generally curved free edge 201 of the bottom panel 121 can be defined between the attachment flap 135 and the end flap 185, a generally curved free edge 203 can be defined between the end flap 185 and the side panel 123, a generally curved free edge 205 can be defined between the side panel 123 and the end flap 193, and a generally curved free edge 207 can be defined between the end flap 193 and the attachment flap 135.

Similarly, a generally curved free edge 209 can be defined between the side panel 123 and the end flap 189, a generally curved free edge 211 can be defined between the end flap 189 and the side panel 131, a generally curved free edge 213 can be defined between the side panel 131 and the end flap 197, and a generally curved free edge 215 can be defined between the end flap 197 and the side panel 123.

The side panel 123 can include a pair of longitudinal free edges 217, 219 that extend from a respective endpoint of the fold line 125 to a respective endpoint of the fold line 129. The side panel 131 can also include a pair of longitudinal free edges 221, 223 extending from a respective endpoint of the fold line 133 to a respective endpoint of a lateral free edge 224 of the side panel 131.

As also shown in FIG. 1, the end flap 185 can have a pair of oblique free edges 225, 226 extending from respective endpoints of the fold line 187 to a longitudinal free edge 227 of the end flap 185. Similarly, the end flap 189 can have a pair of oblique free edges 229, 231 extending from respective endpoints of the fold line 191 to a longitudinal free edge 233 of the end flap 189. The end flap 193 can include a pair of oblique free edges 235, 237 extending from respective endpoints of the fold line 195 to a longitudinal free edge 239 of the end flap 193. The end flap 197 can include a pair of oblique free edges 241, 243 extending from respective endpoints of the fold line 199 to a longitudinal free edge 245 of the end flap 197.

In some embodiments, further oblique edges can be positioned between a respective oblique edge 225, 226 and the longitudinal edge 227 and/or a respective oblique edge 235, 237 and the longitudinal edge 239.

It will be understood that the blank 103 and carrier 105 formed therefrom can have a different arrangement of edges without departing from the disclosure.

Figure 2:
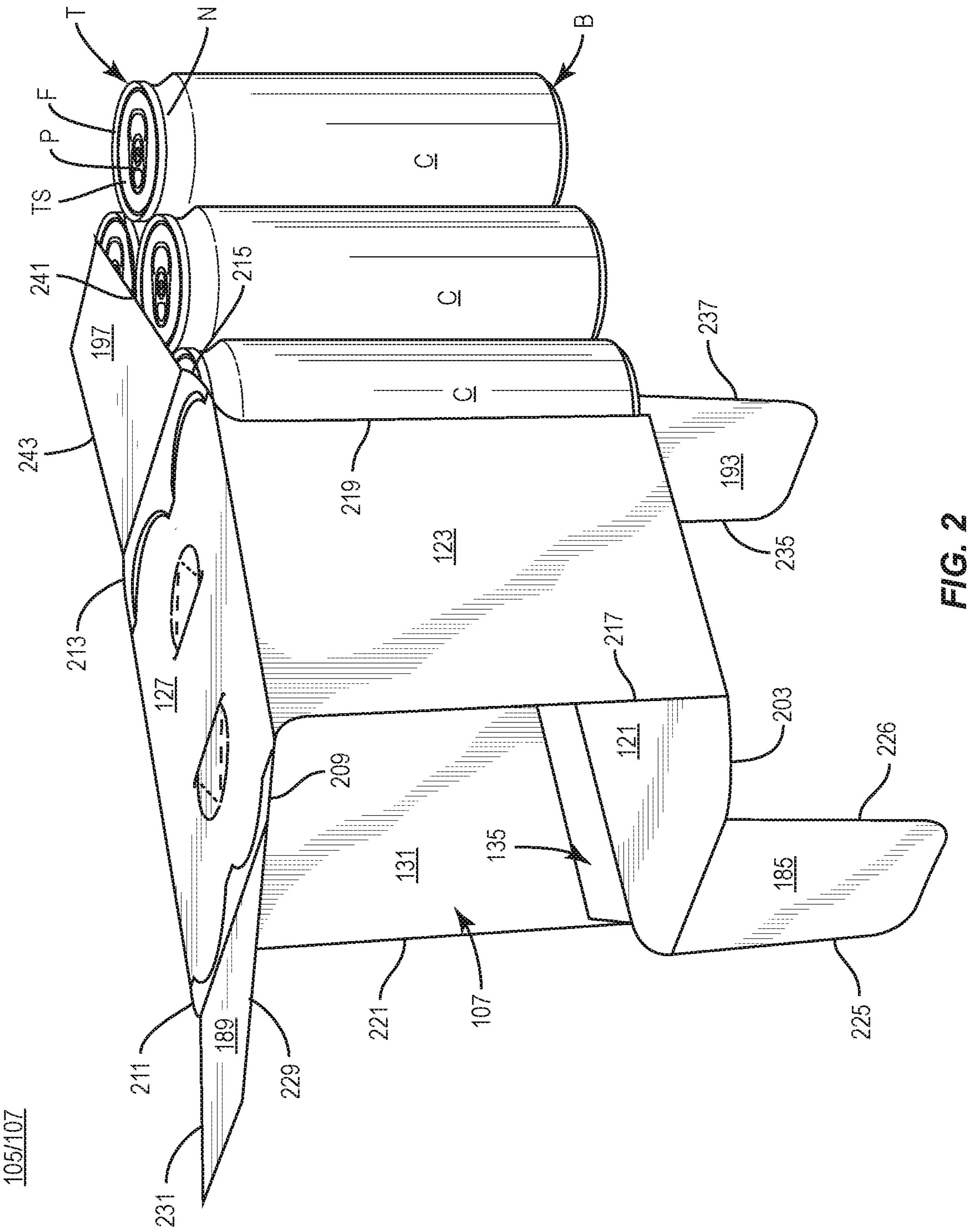
FIG. 2 is a perspective view of a carrier formed from the blank of FIG. 1 with open ends and showing containers being loaded according to an exemplary embodiment of the disclosure.

With additional reference to FIGS. 2 and 3, in some embodiments, the top panel 127 can be positioned in spaced and generally parallel relation over the bottom panel 121, with the side panels 123, 131 extending from the top panel 127 to the bottom panel 121 so as to extend at least partially around the interior 107 of the carrier 105.

The aforementioned arrangement of panels can be accomplished, in some embodiments, via relative folding at the fold lines 125, 129, 133, 135. In order to maintain such arrangement, the attachment flap 135 can be folded at the fold line 137 such that the exterior surface thereof is positioned in at least partial face-to-face contact with the interior surface of the side panel 131. In some embodiments, the interior surface of one or more of the attachment flap 135 and the side panel 131 can be provided with one or more applications of an adhesive such as glue to adhere the attachment flap 135 to the side panel 131.

Such an arrangement of the panels of the carrier 105, in which the interior 107 thereof is formed but prior to the formation of the ends 109, 111 of the carrier 105, can be an open sleeve configuration of the carrier 105 for receiving the containers C. In this regard, and as shown, the containers C can be grouped and loaded into the interior 107 of the carrier 105, e.g., via being carried on a moving support or conveyor and/or via one or more machine parts, such as a moveable arm or pusher that can advance the containers C into the interior 107 of the carrier 105.

The end flap 185 can be folded upwardly at the fold line 187 and the end flap 189 can be folded downwardly at the fold line 191 into at least partial face-to-face contact with the end flap 185 to form the first end 109 of the carrier 105. Similarly the end flap 193 can be folded upwardly at the fold line 195 and the end flap 197 can be folded downwardly at the fold line 199 into at least partial face-to-face contact with the end flap 193 to form the second end 111 of the carrier 105. In some embodiments, such arrangement of end flaps can be at least partially maintained with one or more applications of an adhesive such as glue.

The containers C can be secured to the carrier 105, at least in part, via the container retention features. In particular, the marginal portion 141 of the top panel 127 can fold obliquely downwardly at the fold line 143 relative to the central portion 139 of the top panel 127 such that the marginal portion 141 and the central portion 139 at least partially separate at the respective cuts 149 and at least partially define respective openings through which the flange portion F of the respective containers C can be at least partially received, e.g., the respective containers C adjacent the end 109 of the carrier 105.

Similarly, the marginal portion 145 of the top panel 127 can fold obliquely downwardly at the fold line 147 relative to the central portion 139 of the top panel 127 such that the marginal portion 145 and the central portion 139 at least partially separate at the respective cuts 151 and at least partially define respective openings through which the flange portion F of the respective containers C can be at least partially received, e.g., the respective containers C adjacent the end 111 of the carrier 105.

In such an arrangement, the marginal portions 141, 145 of the top panel 127 can be positioned extending obliquely against the respective necks N of the respective containers C, with the flange portions F of the respective containers C protruding through openings formed by the cuts 149, 151 to provide a secure engagement of the containers C to the carrier 105, in part, via the at least partial receipt of the containers C in the top panel 127.

In some embodiments, the oblique positioning of the marginal portions 141, 145 of the top panel 137 relative to the central portion 139 thereof can serve as locating features for positioning the respective end flaps 189, 197 for a preselected amount of overlap with the respective end flaps 185, 193. In some embodiments, the amount of overlap between the respective end flaps 185, 189 and/or end flaps 193, 197 can be adjusted, e.g., vertically, to provide a desired level of tightness of the panels and end flaps extending around the containers C.

In some embodiments, portions of the central portion 139 of the top panel 127 adjacent the respective cuts 149, 151 can be positioned at least partially recessed in and/or in at least partial abutting arrangement with the recessed top surface TS of the respective containers C.

As also shown, an open corner 247 (broadly, "first corner" or "second corner" or "third corner" or "fourth corner") of the carrier 105 can be defined between the free edges 201, 211, 221, 225, 231 of the respective panels 121, 127, 131 and end flaps 185, 189, an open corner 249 (broadly, "first corner" or "second corner" or "third corner" or "fourth corner") of the carrier 105 can be defined between the free edges 203, 209, 217, 226, 229 of the respective panels 121, 123, 127 and end flaps 185, 189 of the carrier 105, an open corner 251 (broadly, "first corner" or "second corner" or "third corner" or "fourth corner") of the carrier 105 can be defined between the free edges 207, 213, 223, 235, 243 of the respective panels 121, 123, 127 and end flaps 193, 197, and an open corner 253 (broadly, "first corner" or "second corner" or "third corner" or "fourth corner") of the carrier 105 can be defined between the free edges 205, 215, 219, 237, 241 of the respective panels 121, 123, 127 and end flaps 193, 197.

In the illustrated embodiment, the open corners 247, 249, 251, 253 can provide visualization to portions of the containers C adjacent the corners 247, 249, 251, 253, for example, to provide visibility to graphics associated with product or promotional information, nutritional information, pricing information (e.g., bar codes, QR codes, etc.). In some embodiments, the open corners 247, 249, 251, 253 can provide access to the interior 107 of the carrier 105 for withdrawing one or more containers C therefrom, which can include, for example, stretching or tearing adjacent portions of the carrier 105. In some embodiments, the open corners 247, 249, 251, 253 can provide ventilation and/or a path of egress for moisture associated with the containers C, e.g., due to condensation, icewater runoff, spillage, etc.

In this regard, one or more of the free edges 201, 203, 205, 207, 209, 211, 213, 215, 217, 219, 221, 223, 225, 226, 229, 231, 235, 237, 241, 243 can be product visibility features of the blank 103 and carrier 105 formed therefrom for forming at least one of the open corners 247, 249, 251, 253 of the carrier 105.

In order to engage the handle features, a user can at least partially separate one or both of the handle flaps 153, 169 from the top panel 127 at the respective cuts 157, 173 and fold the respective handle flap 153, 169 at least partially downwardly into the interior 107 of the carrier 105 at the respective fold lines 155, 171. In such an arrangement, a user can insert one or more of his or her fingers into the interior 107 of the carrier 105 formed by openings exposed from the aforementioned movement of the handle flaps 153, 169. It will be understood that the handle flaps 153, 169 can provide a barrier or buffer between a user's finger(s) and the containers C and/or surfaces/edges of the carrier 105.

In some embodiments, the marginal portions 161, 165 of the handle flap 153 can move relative to the central portion 159 thereof at the respective lines of weakening 163, 167 to at least partially surround the user's finger(s) to provide additional protection, avoid pinching or discomfort, etc. Similarly, the marginal portions 177, 181 of the handle flap 169 can move relative to the central portion 185 thereof at the respective lines of weakening 179, 183 to at least partially surround the user's finger(s). In this regard, in some embodiments, a user can engage the handle flaps 153, 169, the exterior surface of the top panel 127 proximate the fold lines 155, 171, and/or an interior surface of the top panel 127 to lift, carry, and/or otherwise move or engage the carrier 105.

In view of the foregoing, a blank 103 and carrier 105 formed therefrom is provided having container retention features for at least partially receiving respective container C of a plurality of containers C. Such an arrangement provides an attachment of respective containers C to a respective panel of a plurality of panels of the blank 103/carrier 105, with the plurality of panels extending at least partially around the containers C to provide a secure attachment of the containers C to the carrier 105 (and vice-versa), as well as allowing the plurality of panels to be positioned around the containers C to provide a desired level of tightness. Furthermore, the open corners 247, 249, 251, 253 of the carrier 105 provide visibility and/or access to containers C in the interior 107 of the carrier 105 that can facilitate ready identification of products and/or access to one or more of the containers C.

In general, the blank may be constructed from paperboard having a caliper so that it is heavier and more rigid than ordinary paper. The blank can also be constructed of other materials, such as cardboard, or any other material having properties suitable for enabling the carrier to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding thereal-ong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding a plurality of containers, the carrier comprising:

a plurality of panels extending at least partially around an interior of the carrier, the plurality of panels comprising a top panel, a bottom panel, a marginal portion, and at least one side panel;

a plurality of end flaps foldably connected to a respective panel of the plurality of panels at least partially overlapped to form at least one end of the carrier;

container retention features disposed in the marginal portion and in the top panel for at least partially receiving a portion of a respective container of the plurality of containers; and at least one open corner of the carrier defined between a free edge of the top panel, a free edge of the bottom panel, a free edge of the marginal portion, and a free edge of the at least one side panel.

2. The carrier of claim 1, wherein the top panel comprises a central portion foldably connected to the marginal portion at a fold line.

3. The carrier of claim 2, wherein the marginal portion is obliquely arranged relative to the central portion of the top panel.

4. The carrier of claim 3, wherein the fold line is interrupted by a plurality of curved cuts.

5. The carrier of claim 4, wherein the plurality of curved cuts at least partially define a space between the marginal portion and the central portion of the top panel for at least partially receiving a respective container of the plurality of containers.

6. The carrier of claim 5, wherein the at least one side panel is foldably connected to the top panel.

7. The carrier of claim 6, wherein the plurality of end flaps comprises a first top end flap foldably connected to the marginal portion of the top panel and a first bottom end flap foldably connected to the bottom panel, the at least one end of the carrier is a first end of the carrier, and the first top end flap and the first bottom end flap are overlapped in at least partial face-to-face contact to form the first end of the carrier.

8. The carrier of claim 7, wherein the at least one open corner of the carrier is further defined between a free edge of the first top end flap, a free edge of the first bottom end flap, the free edge of the top panel, the free edge of the bottom panel, the free edge of the at least one side panel, and the free edge of a respective panel of the plurality of panels.

9. The carrier of claim 8, wherein the free edge of the top panel and the free edge of the bottom panel are each curved.

10. The carrier of claim 9, wherein the at least one side panel is a first side panel and the plurality of panels further comprises a second side panel foldably connected to the top panel, the at least one open corner of the carrier is a first open corner of the carrier, and the carrier further comprises a second open corner at least partially defined between the top panel, the bottom panel, the second side panel, the first top end flap, and the first bottom end flap.

11. The carrier of claim 10, wherein the marginal portion is a first marginal portion foldably connected to the central portion of the top panel, the fold line is a first fold line, and the top panel further comprises a second marginal portion foldably connected to the central portion of the top panel at a second fold line interrupted by a plurality of curved cuts for at least partially receiving a respective container of the plurality of containers.

12. The carrier of claim 11, wherein the plurality of end flaps further comprises a second top end flap foldably connected to the second marginal portion of the top panel and a second bottom end flap foldably connected to the bottom panel, the second top end flap and the second bottom end flap overlapped in at least partial face-to-face contact to form a second end of the carrier.

13. The carrier of claim 12, wherein the carrier further comprises a third open corner at least partially defined between the top panel, the bottom panel, the first side panel, the second top end flap, and the second bottom end flap, the carrier further comprising a fourth open corner at least partially defined between the top panel, the bottom panel, the second side panel, the second top end flap, and the second bottom end flap.

14. The earner of claim 13, wherein the carrier further comprises handle features comprising a handle flap foldably connected to the top panel and at least partially separable from the top panel.

15. A blank for forming a carrier for holding a plurality of containers, the blank comprising:

a plurality of panels for extending at least partially around an interior of the carrier formed from the blank, the plurality of panels comprising a top panel, a bottom panel, a marginal portion, and at least one side panel;

a plurality of end flaps foldably connected to a respective panel of the plurality of panels for being at least partially overlapped to form at least one end of the carrier formed from the blank;

container retention features disposed in the marginal portion and in the top panel for at least partially receiving a portion of a respective container of the plurality of containers; and a free edge of the top panel, a free edge of the bottom panel, a free edge of the marginal portion, and a free edge of the at least one side panel for being arranged for forming at least one open corner of the carrier formed from the blank.

16. The blank of claim 15, wherein the top panel comprises a central portion foldably connected to the marginal portion at a fold line.

17. The blank of claim 16, wherein the fold line is interrupted by a plurality of curved cuts.

18. The blank of claim 17, wherein the plurality of curved cuts at least partially define a space between the marginal portion and the central portion of the top panel for at least partially receiving a respective container of the plurality of containers.

19. The blank of claim 18, wherein the at least one side panel is foldably connected to the top panel.

20. The blank of claim 19, wherein the plurality of end flaps comprises a first top end flap foldably connected to the marginal portion of the top panel and a first bottom end flap foldably connected to the bottom panel, the at least one end of the carrier formed from the blank is a first end of the carrier formed from the blank, and the first top end flap and the first bottom end flap are for being overlapped in at least partial face-to-face contact to form the first end of the carrier formed from the blank.

21. The blank of claim 20, wherein the at least one open corner of the carrier formed from the blank for being defined between a free edge of the first top end flap, a free edge of the first bottom end flap, the free edge of the top panel, the free edge of the bottom panel, the free edge of the at least one side panel, and the free edge of a respective panel of the plurality of panels.

22. The blank of claim 21, wherein the free edge of the top panel and the free edge of the bottom panel are each curved.

23. The blank of claim 22, wherein the at least one side panel is a first side panel and the plurality of panels further comprises a second side panel foldably connected to the top panel, the at least one open corner of the carrier formed from the blank is a first open corner of the carrier formed from the blank, and the top panel, the bottom panel, the second side panel, the first top end flap, and the first bottom end flap are for being arranged to at least partially a second open corner of the carrier formed from the blank.

24. The blank of claim 23, wherein the marginal portion is a first marginal portion foldably connected to the central portion of the top panel, the fold line is a first fold line, and the top panel further comprises a second marginal portion foldably connected to the central portion of the top panel at a second fold line interrupted by a plurality of curved cuts for at least partially receiving a respective container of the plurality of containers.

25. The blank of claim 24, wherein the plurality of end flaps further comprises a second top end flap foldably connected to the second marginal portion of the top panel and a second bottom end flap foldably connected to the bottom panel, the second top end flap and the second bottom end flap are for being overlapped in at least partial face-to-face contact to form a second end of the carrier formed from the blank.

26. The blank of claim 25, wherein the top panel, the bottom panel, the first side panel, the second top end flap, and the second bottom end flap are for being arranged to at least partially define a third open corner of the carrier formed from the blank, and the top panel, the bottom panel, the second side panel, the second top end flap, and the second bottom end flap are for being arranged to at least partially define a fourth open corner of the carrier formed from the blank.

27. The blank of claim 26, further comprising handle features comprising a handle flap foldably connected to the top panel and at least partially separable from the top panel.

28. A method of forming a carrier for holding a plurality of containers, the method comprising:

obtaining a blank, the blank comprising a plurality of panels comprising a top panel, a bottom panel, a marginal portion, and at least one side panel, a plurality of end flaps foldably connected to a respective panel of the plurality of panels, and container retention features disposed in the marginal portion and in the top panel;

positioning the plurality of panels extending at least partially around an interior of the carrier;

at least partially overlapping the plurality of end flaps to form at least one end of the carrier;

positioning the container retention features for at least partially receiving a portion of a respective container of the plurality of containers; and arranging a free edge of the top panel, a free edge of the bottom panel, a free edge of the marginal portion, and a free edge of the at least one side panel to form at least one open corner of the carrier.

29. The method of claim 28, wherein the top panel comprises a central portion foldably connected to the marginal portion at a fold line.

30. The method of claim 29, wherein positioning the container retention features comprises obliquely arranging the marginal portion relative to the central portion of the top panel.

31. The method of claim 30, wherein the fold line is interrupted by a plurality of curved cuts.

32. The method of claim 31, wherein the plurality of curved cuts at least partially define a space between the marginal portion and the central portion of the top panel for at least partially receiving a respective container of the plurality of containers.

33. The method of claim 32, wherein the at least one side panel is foldably connected to the top panel.

34. The method of claim 33, wherein the plurality of end flaps comprises a first top end flap foldably connected to the marginal portion of the top panel and a first bottom end flap foldably connected to the bottom panel, the at least one end of the carrier is a first end of the carrier, and the method comprises at least partially overlapping the first top end flap and the first bottom end flap in at least partial face-to-face contact to form the first end of the carrier.

35. The method of claim 34, wherein the at least one open corner of the carrier is further defined between a free edge of the first top end flap, a free edge of the first bottom end flap, the free edge of the top panel, the free edge of the bottom panel, the free edge of the at least one side panel, and the free edge of a respective panel of the plurality of panels.

36. The method of claim 35, wherein the free edge of the top panel and the free edge of the bottom panel are each curved.

37. The method of claim 36, wherein the at least one side panel is a first side panel and the plurality of panels further comprises a second side panel foldably connected to the top panel, the at least one open corner of the carrier is a first open corner of the carrier, and the method further comprises arranging the top panel, the bottom panel, the second side panel, the first top end flap, and the first bottom end flap to at least partially define a second open corner of the carrier.

38. The method of claim 37, wherein the marginal portion is a first marginal portion foldably connected to the central portion of the top panel, the fold line is a first fold line, and the top panel further comprises a second marginal portion foldably connected to the central portion of the top panel at a second fold line interrupted by a plurality of curved cuts for at least partially receiving a respective container of the plurality of containers.

39. The method of claim 38, wherein the plurality of end flaps further comprises a second top end flap foldably connected to the second marginal portion of the top panel and a second bottom end flap foldably connected to the bottom panel, and the method further comprises at least partially overlapping the second top end flap and the second bottom end flap in at least partial face-to-face contact to form a second end of the carrier.

40. The method of claim 39, further comprising arranging the top panel, the bottom panel, the first side panel, the second top end flap, and the second bottom end flap to at least partially define a third open corner of the carrier, and the method further comprises arranging the top panel, the bottom panel, the second side panel, the second top end flap, and the second bottom end flap to at least partially define a fourth open corner of the carrier.

41. The method of claim 40, wherein the carrier further comprises handle features comprising a handle flap foldably connected to the top panel and at least partially separable from the top panel.

42. A package, the package comprising:

a plurality of containers; and a carrier holding the plurality of containers, the carrier comprising:

a plurality of panels extending at least partially around an interior of the carrier, the plurality of panels comprising a top panel, a bottom panel, a marginal portion, and at least one side panel;

a plurality of end flaps foldably connected to a respective panel of the plurality of panels at least partially overlapped to form at least one end of the carrier;

container retention features disposed in the marginal portion and in the top panel at least partially receiving a portion of a respective container of the plurality of containers; and at least one open corner of the carrier defined between a free edge of the top panel, a free edge of the bottom panel, a free edge of the marginal portion, and a free edge of the at least one side panel.

43. The package of claim 42, wherein the top panel comprises a central portion foldably connected to the marginal portion at a fold line.

44. The package of claim 43, wherein the marginal portion is obliquely arranged relative to the central portion of the top panel.

45. The package of claim 44, wherein the fold line is interrupted by a plurality of curved cuts.

46. The package of claim 45, wherein the plurality of curved cuts at least partially define a space between the marginal portion and the central portion of the top panel at least partially receiving a respective container of the plurality of containers.

47. The package of claim 46, wherein the at least one side panel is foldably connected to the top panel.

48. The package of claim 47, wherein the plurality of end flaps comprises a first top end flap foldably connected to the marginal portion of the top panel and a first bottom end flap foldably connected to the bottom panel, the at least one end of the carrier is a first end of the carrier, and the first top end flap and the first bottom end flap are overlapped in at least partial face-to-face contact to form the first end of the carrier.

49. The package of claim 48, wherein the at least one open corner of the carrier is further defined between a free edge of the first top end flap, a free edge of the first bottom end flap, the free edge of the top panel, the free edge of the bottom panel, the free edge of the at least one side panel, and the free edge of a respective panel of the plurality of panels.

50. The package of claim 49, wherein the free edge of the top panel and the free edge of the bottom panel are each curved.

51. The package of claim 50, wherein the at least one side panel is a first side panel and the plurality of panels further comprises a second side panel foldably connected to the top panel, the at least one open corner of the carrier is a first open corner of the carrier, and the carrier further comprises a second open corner at least partially defined between the top panel, the bottom panel, the second side panel, the first top end flap, and the first bottom end flap.

52. The package of claim 51, wherein the marginal portion is a first marginal portion foldably connected to the central portion of the top panel, the fold line is a first fold line, and the top panel further comprises a second marginal portion foldably connected to the central portion of the top panel at a second fold line interrupted by a plurality of curved cuts at least partially receiving a respective container of the plurality of containers.

53. The package of claim 52, wherein the plurality of end flaps further comprises a second top end flap foldably connected to the second marginal portion of the top panel and a second bottom end flap foldably connected to the bottom panel, the second top end flap and the second bottom end flap overlapped in at least partial face-to-face contact to form a second end of the earner.

54. The package of claim 53, wherein the carrier further comprises a third open corner at least partially defined between the top panel, the bottom panel, the first side panel, the second top end flap, and the second bottom end flap, the carrier further comprising a fourth open corner at least partially defined between the top panel, the bottom panel, the second side panel, the second top end flap, and the second bottom end flap.

55. The package of claim 54, wherein the carrier further comprises handle features comprising a handle flap foldably connected to the top panel and at least partially separable from the top panel.

* * * * *